United States Patent
Brehm et al.

(10) Patent No.: US 8,702,551 B2
(45) Date of Patent: Apr. 22, 2014

(54) WOBBLE MECHANISM

(75) Inventors: Horst Brehm, Bischberg (DE); Jochen Hofmann, Marktgraitz (DE); Gregor Kroener, Bischberg (DE)

(73) Assignee: Brose Fahrzeugteile GmbH & Co. Kommanditgesellschaft, Coburg (DE)

( * ) Notice: Subject to any disclaimer, the term of this patent is extended or adjusted under 35 U.S.C. 154(b) by 468 days.

(21) Appl. No.: 12/721,825

(22) Filed: Mar. 11, 2010

(65) Prior Publication Data
US 2010/0222174 A1  Sep. 2, 2010

Related U.S. Application Data

(63) Continuation of application No. PCT/EP2008/007071, filed on Aug. 29, 2008.

(30) Foreign Application Priority Data

Sep. 11, 2007 (DE) .................... 20 2007 012 685 U

(51) Int. Cl.
*F16H 1/32* (2006.01)
(52) U.S. Cl.
USPC ......................................................... 475/163
(58) Field of Classification Search
USPC .................................. 475/162, 163; 297/362
See application file for complete search history.

(56) References Cited

U.S. PATENT DOCUMENTS

| | | | | |
|---|---|---|---|---|
| 5,725,452 | A * | 3/1998 | Droulon et al. | 475/162 |
| 6,076,889 | A * | 6/2000 | Su et al. | 297/362 |
| 6,283,886 | B1 * | 9/2001 | Schumann | 475/162 |
| 2006/0025270 | A1 * | 2/2006 | van de Geer et al. | 475/162 |
| 2006/0084547 | A1 * | 4/2006 | Dill et al. | 475/162 |

FOREIGN PATENT DOCUMENTS

| | | |
|---|---|---|
| DE | 10 2004 007 045 B3 | 6/2005 |
| FR | 2 729 619 A1 | 7/1996 |
| FR | 2 869 847 A1 | 11/2005 |
| JP | 2005 270298 A | 10/2005 |
| WO | WO 96/17187 A | 6/1996 |

OTHER PUBLICATIONS

English Translation of FR2869847, http://translationportal.epo.org, Oct. 26, 2012.*

* cited by examiner

*Primary Examiner* — Roger Pang
(74) *Attorney, Agent, or Firm* — Muncy, Geissler, Olds & Lowe, P.C.

(57) ABSTRACT

A wobble mechanism, in particular for a two-part adjustment fitting of a vehicle seat, is provided with a flat housing with internal toothing and with an oscillating wheel with external toothing, which is arranged within the housing and is eccentrically rotatable around a center axis of the housing. The external toothing of the oscillating wheel engages with the internal toothing of the housing. The housing is divided into at least two housing parts along a dividing plane.

25 Claims, 3 Drawing Sheets

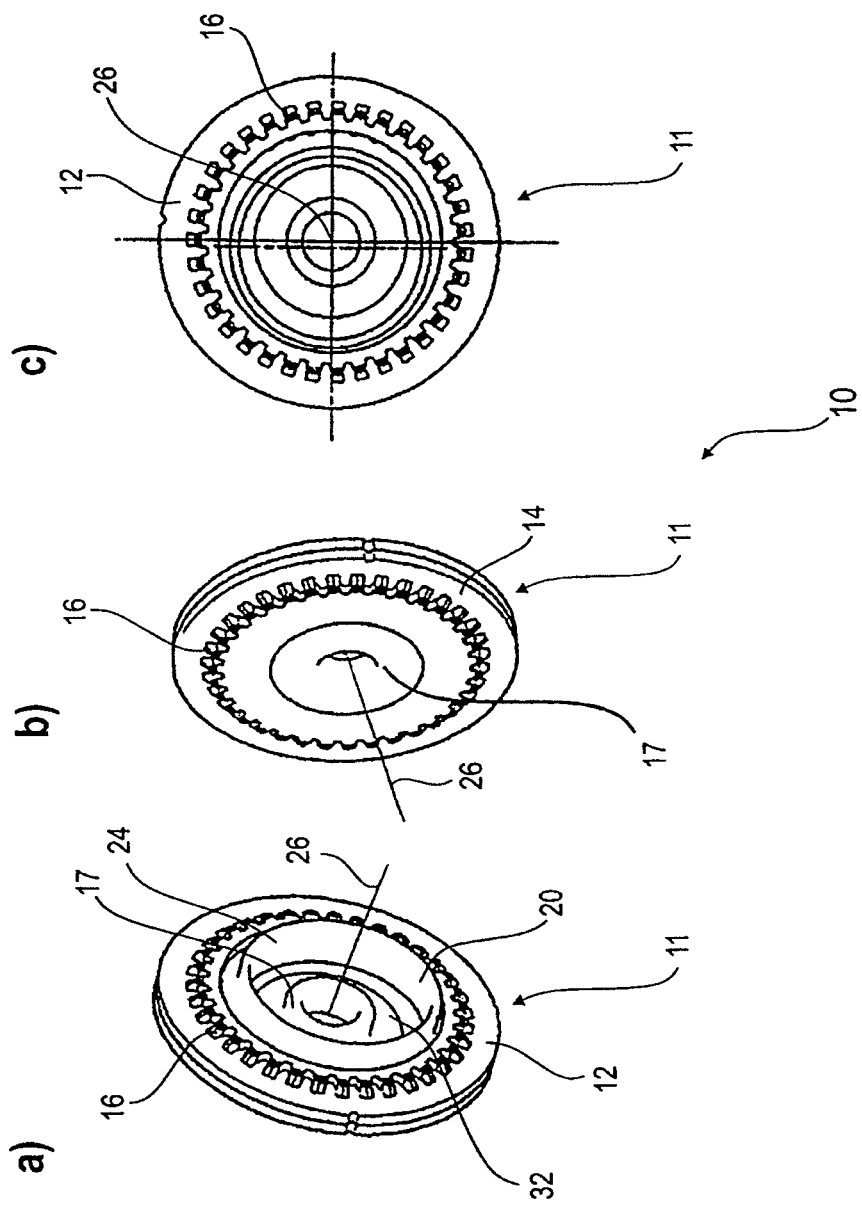

WOBBLE MECHANISM

This nonprovisional application is a continuation of International Application No. PCT/EP2008/007071, which was filed on Aug. 29, 2008, and which claims priority to German Patent Application No. DE 20 2007 012 685.9, which was filed in Germany on Sep. 11, 2007, and which are both herein incorporated by reference.

BACKGROUND OF THE INVENTION

1. Field of the Invention

The present invention relates to a wobble mechanism, in particular for a two-part adjustment fitting of a motor vehicle seat.

2. Description of the Background Art

Conventional seat adjustment mechanisms frequently have wobble mechanisms, which represent a version of planetary gears. By means of this wobble mechanism, relatively large transmission ratios can be achieved in a small space, so that the seatback can quickly be brought to a desired angular position with small adjustment forces. A further advantage of this wobble mechanism is its self-locking characteristic, so that undesirable backrest movement is essentially precluded, even when large forces are applied. The transmission ratio effect of such a wobble mechanism acts in both directions of rotation.

Known from DE 10 2004 007 045 B3 is an adjustment fitting for a motor vehicle seat that is designed as a wobble mechanism. The two flat fitting parts of this fitting have internal or external teeth produced by a forming process.

Illustrated in FR 28 69 847 A1, FR 27 29 619 A1, and JP 205-270298 A are wobble mechanisms for a seat adjustment, wherein two housing parts are rotatable relative to one another. Located in the interior of the two housing parts is an oscillating wheel whose external teeth mesh with the internal teeth of each of the two housing parts. A relative rotation between the two housing parts is accomplished by driving the oscillating wheel. The internal teeth of the two housing parts here have tooth counts that differ from one another. Accordingly, each of the housing parts is associated with either a seat or a backrest for adjustment.

However, as an adjustment fitting for motor vehicle seats, the wobble mechanism should be as compact as possible in design and should be suitable for the transmission of large adjustment forces with small actuating forces. At the same time, a relatively simple construction is needed, so that the mechanisms can be manufactured economically in large-scale mass production.

SUMMARY OF THE INVENTION

An object of the present invention is therefore to provide a wobble mechanism that is of simple construction and is economical to manufacture.

This object is attained according to an embodiment of the invention by a wobble mechanism, in particular for a two-part adjustment fitting of a motor vehicle seat, having a flat housing constituting an outer wheel with internal teeth and having, arranged within the housing so as to be eccentrically rotatable about a center axis of the housing, an oscillating wheel with external teeth, wherein the external teeth of the oscillating wheel mesh with the internal teeth of the housing, and wherein the housing as such is divided along a dividing plane into at least two housing parts, which are joined together in the assembled state.

In the operation of a wobble mechanism, the external teeth of the oscillating wheel roll along the corresponding internal teeth in a wobbling manner. To this end, it is necessary in particular to keep the internal teeth and the external teeth of the wobble mechanism in meshing engagement. To avoid an axial displacement of the oscillating wheel relative to the internal teeth, a suitable securing component, such as, e.g., a retaining ring, is provided according to the conventional art.

The support of the oscillating wheel within a housing that carries the internal teeth makes it possible to hold the axial arrangement of the internal teeth and external teeth of the oscillating wheel upright without it being necessary to use an additional securing component. In other words, the housing itself can provide the axial guidance for the oscillating wheel, while at the same time also constituting the outer wheel. The production costs for such a wobble mechanism are significantly reduced overall in this way. Moreover, the division along a dividing plane permits especially simple assembly and economical production of the housing.

The aforementioned wobble mechanism has only a few components, namely the housing and the oscillating wheel. Moreover, the components can be assembled with small clearance and thus tight tolerances. The tight tolerances are desirable, particularly because of the resulting small switchover clearance during a reversal of the direction of rotation.

The dividing plane of the housing can be arranged perpendicular to the center axis of the housing. The individual housing parts can be manufactured in large-scale production and can simply be screwed, riveted, pressed, glued or welded together during assembly of the wobble mechanism. In the interest of especially economical production, it may in particular be useful to press the housing parts together. Alternatively, welding, which can be carried out rapidly and with high precision by, for example, a laser welder, can also be practical.

The housing is specified in particular as a flat housing that has a disc-like shape, for example. This makes it possible to implement an especially compact construction of the wobble mechanism.

Preferably, the internal teeth of the housing are distributed along the dividing plane in such a manner that a first housing part and a second housing part each include some of the divided internal teeth. For assembly in this embodiment, the oscillating wheel is simply laid inside one housing part, and the second housing part is placed on top of the first. The complete internal toothing of the housing results from the joining of the two housing parts.

In an embodiment of the invention, one housing part can have internal teeth that are radially set back or reduced in size as compared to the other housing part. In this case, the internal teeth that are set back or reduced in size only come into engagement with the external teeth of the oscillating wheel under a high load that is associated with a mechanical deformation, in particular in the case of a crash. An improved blocking action is achieved in the event of a crash by the resulting additional engagement with the teeth of the housing part that was previously not engaged.

The internal teeth can be produced in an especially economical manner in that they are introduced into the housing halves by forming. In this context, it can be especially advantageous for the internal teeth to be introduced into the two housing halves by a deep-drawing process, with the housing halves then preferably being made of sheet metal. The pressing or deep-drawing process permits production with very good dimensional accuracy, which is essential for proper functioning of the wobble mechanism. Generally speaking, a high-strength sheet steel that can be brought to the desired shape without cracking is suitable for the intended application. The material of both housing halves must withstand the loading from use as a gear; however, in this regard it is necessary to take into account that adjustments do not take place very often over the average lifetime, so that the primary loading for the wobble mechanism, and thus the housing with internal teeth, takes place in the fixing and locking of the previously set position.

The first housing part can have a stop face that projects radially inward and engages around the external teeth of the oscillating wheel. In other words, such a stop face engages around the external teeth of the oscillating wheel in approximately an L shape as viewed in cross-section, via which the oscillating wheel is secured axially in one direction with respect to the first housing part. In this implementation, the stop face has, in particular, a central opening, providing a material-saving design.

The second housing part can be designed as a flat disk, with the internal teeth being enclosed if desired. The second housing part in this case can be designed with the same outside diameter as the first housing part. The second housing part here can be manufactured essentially as a simple, economical stamped part, at the radially outer edge of which the internal teeth are introduced, for example by forming.

Actuation of the wobble mechanism can be accomplished through an eccentric component that can be driven by a swivel shaft. Especially to accommodate the swivel shaft, the second housing part can include a central bushing. The central bushing is provided simply as, e.g., a bore, through which the swivel shaft is passed in the installed state of the wobble mechanism, for example in a seat adjustment mechanism.

In an embodiment, the bushing can be designed as a shoulder surrounding the center axis that projects axially into a central recess of the oscillating wheel that is bordered by the external teeth. An eccentric component can be located in the central recess of the wobble mechanism. As a result of the design of the bushing as a shoulder, it is possible to support, in particular, the eccentric component on the annular shoulder and also to improve the radial support of the oscillating wheel.

In another embodiment, the wobble mechanism can include a collar surrounding the central recess, with which the oscillating wheel projects out of a central opening of the first housing part. In particular, this measure facilitates handling during assembly of the wobble mechanism and achieves an additional guidance of the oscillating wheel in the housing. In this context, the central opening of the first housing part can be bordered, in particular, by the radially inward-projecting stop face.

For production or assembly reasons, at least one housing part can be made in multiple parts. The oscillating wheel may also be designed as multiple parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 illustrates various views of the wobble mechanism with connected housing parts.

DETAILED DESCRIPTION

Figure 1:
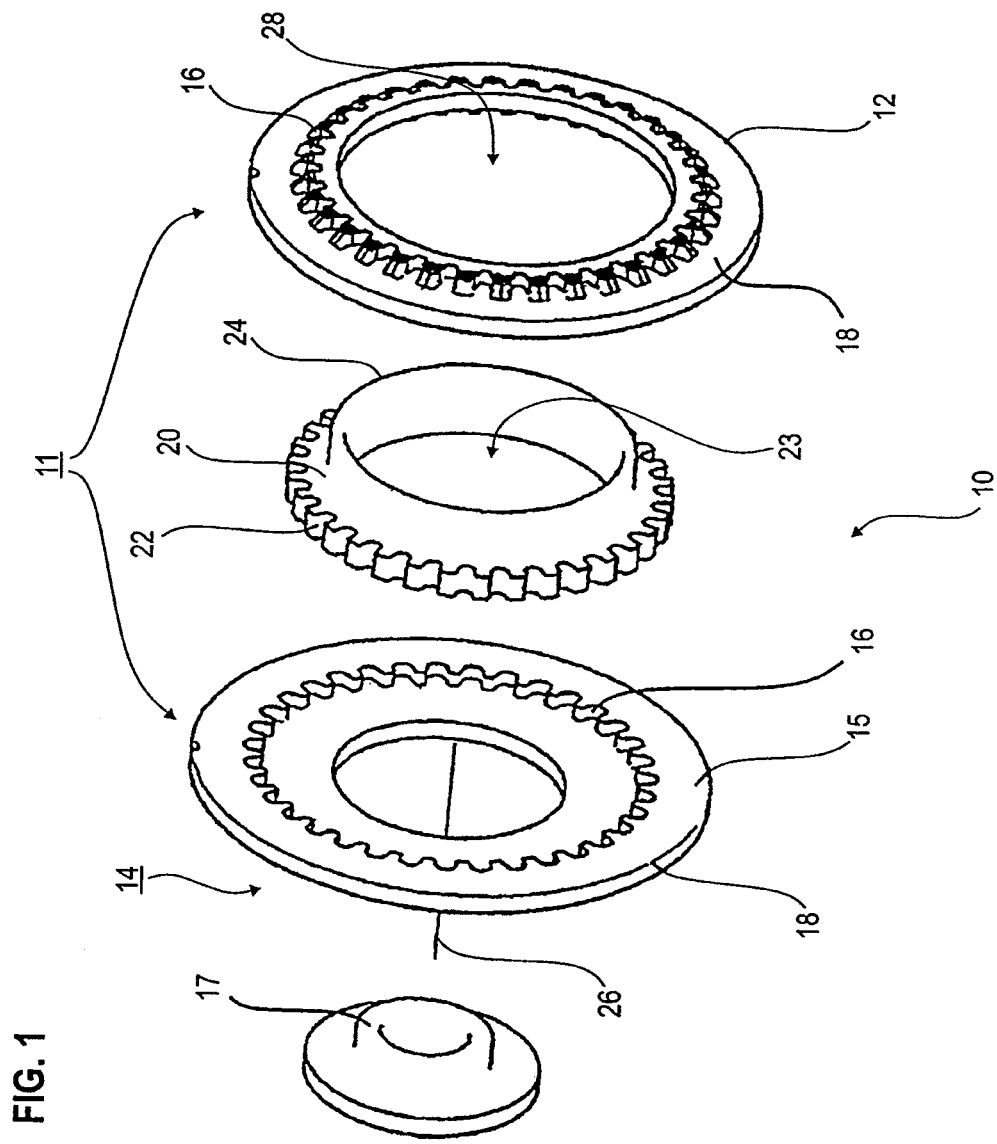
FIG. 1 is an exploded view of a wobble mechanism with a two-part housing.

The components of an exemplary wobble mechanism 10 are evident from the exploded view in FIG. 1. In accordance therewith, the wobble mechanism 10 comprises a housing 11 with first and second housing parts 12 and 14, and an oscillating wheel 20 guided in the housing 11.

The housing parts 12, 14 are separated along a dividing plane. The internal teeth 16 introduced into the housing 11 are likewise separated here, so that the two housing parts 12, 14 each have a part of the internal teeth 16. The second housing part 14 is composed of a planar ring 15 in which a part of the internal toothing 16 is introduced, and of a separate bushing with an annular shoulder 17. Overall, the second housing part 14 essentially has the shape of a flat disk. The annular shoulder 17 is provided in particular for the rotatable support of an eccentric component, not shown here, for driving the wobble mechanism 10.

Each of the two housing parts 12 and 14 can have a stamped metal sheet, via which an outer, flat annular section 18 remains. Each of the stamped metal sheets is provided with the internal teeth 16, for example in a subsequent deep-drawing process. Only the back side, i.e. the negative contour, of the internal teeth 16 of the first housing part 12 is visible here. Since both primarily disk-shaped housing parts 12, 14 preferably have the same outer diameter, they can be joined together at their parallel annular sections 18, for example by pressing or welding of the annular sections 18.

The space formed between the two housing parts 12, 14 serves to accommodate the oscillating wheel 20, which has external teeth 22 that mesh with the internal teeth 16 of the housing 11.

The oscillating wheel 20 has a central recess 23, which is surrounded here by a collar 24. In the assembled state of the housing 11, the collar 24 projects out of a central opening 28 of the first housing half 12 located in the vicinity of a center axis 26 of the housing 11.

Figure 2:
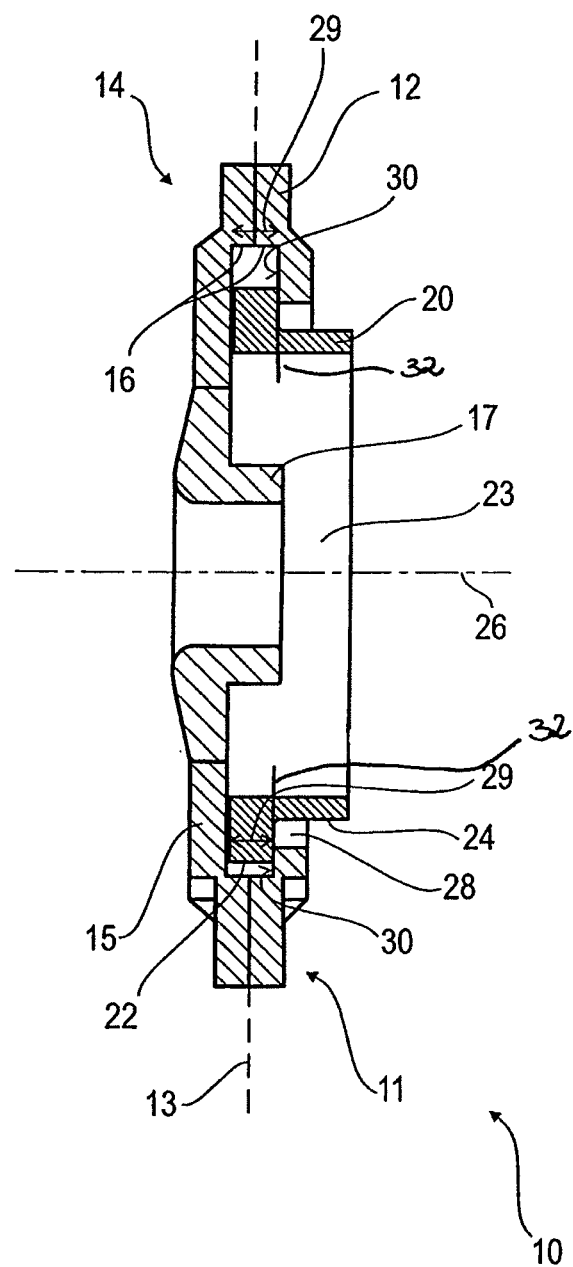
FIG. 2 illustrates a wobble mechanism in a cross-sectional view with a section plane through the center axis of the housing.

The cross-sectional representation in FIG. 2 illustrates the arrangement of the above-described individual parts in the assembled state of the wobble mechanism 10. The oscillating wheel 20 is located inside the housing 11 eccentrically to its center axis 26. By this means, the external teeth 22 of the oscillating wheel 20 mesh with the assembled internal teeth 16 of the housing 11, via which the desired rotational transmission is achieved.

The dividing plane 13 of the housing 11 here is located approximately in the center of the tooth width 29 of the internal teeth 16, so that the internal teeth 16 of the two housing parts 12 and 14 are each subjected to half of the resulting tooth forces. However, it is also possible in this regard to recess one of the two partial sets of teeth, so that the internal teeth 16 of only one housing part 12, 14 mesh with the external teeth 22 of the oscillating wheel 20. In this case, the oscillating wheel 20 can mesh with the partial set of internal teeth of the other housing part, in particular in the event of a mechanical deformation under high load, e.g. under the influence of high crash forces, by which means an improved blocking action, and to this extent higher crash resistance, is achieved.

A radially inward-projecting stop face 30 of the first housing part 12 is also clearly evident in the cross-sectional view in FIG. 2. The stop face 30 engages around the external teeth 22 of the oscillating wheel 20 in approximately an L shape. By this means, the oscillating wheel 20 is clamped and axially secured between the stop face 30 and the second housing half 14. An additional securing component for axially securing the oscillating wheel 10 is thus unnecessary. It is also clearly evident how the stop face 30 surrounds the central opening 28 of the first housing half 12 and how the collar 24 of the oscillating wheel 20 projects out of the opening 28.

The annular shoulder 17 of the bushing of the second housing part 14 projects into the recess 23 of the oscillating wheel 20. This forms, in particular, a receiving space 32 in which the eccentric component, not shown here, for driving the wobble mechanism 10 can be accommodated and rotatably supported on the shoulder 17 of the bushing.

As shown in FIGS. 1 and 2, a separate bushing with the annular shoulder 17 is fixed in the planar ring 15 of the second housing part 14, for example by pressing or laser welding. As a result of the design of the bearing as a separate bushing, different material thicknesses can be combined with one another without difficulty. The same applies to the oscillating wheel 20, which can also be implemented as two parts for this purpose. Alternatively, it is equally possible to form the shoulder 17 out of one metal sheet in producing the second housing part 14.

It is also evident from FIG. 2 that the oscillating wheel 20 can be made such that it is divided along the plane of separation 32.

The schematic representation in FIG. 3 shows three views of the assembled wobble mechanism 10, comprising the housing 11 with the two housing parts 12 and 14 and the oscillating wheel 20 supported therein, but without the eccentric component accommodated in the receiving space 32 and required for rotatably driving the wobble mechanism 10. FIG. 3a shows an oblique view of the wobble mechanism 10 from the side of the first housing part 12. FIG. 3b likewise shows an oblique view of the wobble mechanism 10, this time from the side of the second housing part 14. FIG. 3c shows the same wobble mechanism 10 in a front view from the first housing part 12.

Clearly evident in all three views is the flat construction of the wobble mechanism 10 with the disk-shaped housing parts 12, 14 resting flat against one another, while the negative contour of the internal teeth 16 formed in the first and second housing parts 12, 14 is distinctly visible from the outside.

FIG. 3a clearly shows how the receiving space for the eccentric component is formed by the annular shoulder 17 of the bushing of the second housing part 14 and the collar 24 of the oscillating wheel 20.

Visible in particular in FIG. 3b is how the shoulder 17 of the bushing of the second housing part 14 is domed inward in the axial direction into the plane of the drawing.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A wobble mechanism for a two-part adjustment fitting of a motor vehicle seat, the wobble mechanism comprising:
a flat housing having an outer wheel with internal teeth; and
an oscillating wheel arranged within the housing and configured to be eccentrically rotatable about a center axis of the housing, the oscillating wheel having external teeth,
wherein the external teeth of the oscillating wheel mesh with the internal teeth of the housing, and
wherein the housing is divided along a dividing plane into at least two flat disks, which are joined together in an assembled state, each of the flat disks having a same diameter and comprising parallel annular sections.

2. The wobble mechanism according to claim 1, wherein the housing is divided along the internal teeth.

3. The wobble mechanism according to claim 2, wherein one flat disk has internal teeth that are radially set back or reduced in size as compared to the other flat disk.

4. The wobble mechanism according to claim 1, wherein one flat disk has a stop face that projects radially inward and engages around the external teeth of the oscillating wheel.

5. The wobble mechanism according to claim 1, wherein internal teeth of one of the flat disks are enclosable.

6. The wobble mechanism according to claim 1, wherein one flat disk has a central bushing.

7. The wobble mechanism according to claim 6, wherein the bushing is a shoulder surrounding the center axis that projects axially into a central recess of the oscillating wheel.

8. The wobble mechanism according to claim 7, wherein the oscillating wheel includes a collar surrounding the central recess, with which the oscillating wheel projects axially out of a central opening of the housing.

9. The wobble mechanism according to claim 1, wherein at least one flat disk is made in multiple parts.

10. The wobble mechanism according to claim 1, wherein the oscillating wheel is made in multiple parts.

11. The wobble mechanism according to claim 1, wherein the housing is divided such that the at least two flat disks each have a portion of the internal teeth.

12. The wobble mechanism according to claim 1, wherein the housing is divided along a width of the internal teeth.

13. The wobble mechanism according to claim 1, further comprising a central bushing having an aperture.

14. The wobble mechanism according to claim 1, wherein the external teeth are a single set of external teeth disposed around an external circumference of the oscillating wheel.

15. The wobble mechanism according to claim 14, wherein the housing is divided such that the at least two flat disks each have a portion of the internal teeth, and
wherein the single set of external teeth engages the portion of the internal teeth on each of the at least two flat disks.

16. The wobble mechanism according to claim 1, wherein the parallel annular sections are in contact with each other.

17. The wobble mechanism according to claim 1, wherein the housing parts rest flat against one another.

18. A wobble mechanism for a two-part adjustment fitting of a motor vehicle seat, the wobble mechanism comprising:
a flat housing having an outer wheel with internal teeth;
an oscillating wheel arranged within the housing and configured to be eccentrically rotatable about a center axis of the housing, the oscillating wheel having external teeth; and
a central bushing having an aperture,
wherein the external teeth of the oscillating wheel mesh with the internal teeth of the housing,
wherein the housing is divided along a dividing plane into at least two housing parts, which are joined together in an assembled state, and
wherein the bushing fits into and supports an aperture of one of the at least two housing parts.

19. A wobble mechanism for a two-part adjustment fitting of a motor vehicle seat, the wobble mechanism comprising:
a flat housing having an outer wheel with internal teeth; and
an oscillating wheel arranged within the housing and configured to be eccentrically rotatable about a center axis of the housing, the oscillating wheel having external teeth,
wherein the external teeth of the oscillating wheel mesh with the internal teeth of the housing, and
wherein the housing is divided along a dividing plane into at least two housing parts, which are joined together in an assembled state,
wherein one housing part has a central bushing,
wherein the bushing is a shoulder surrounding the center axis that projects axially into a central recess of the oscillating wheel, and
wherein the bushing has an aperture and wherein the bushing fits into and supports an aperture of one of the at least two housing parts.

20. A mechanism, comprising:
a housing having internal teeth, the housing divided into at least two flat disks along a width of the internal teeth such that each of the at least two housing parts includes a portion of the internal teeth, the flat disks having a same diameter and comprising parallel annular sections; and
an oscillating wheel arranged within the housing and having a single set of external teeth disposed around a circumference of the oscillating wheel, wherein the external teeth of the oscillating wheel mesh with the portion of internal teeth of each of the at least two flat disks.

21. A mechanism, comprising:
a flat housing having an outer wheel with internal teeth and a central opening located in a vicinity of a center axis of the housing;
an oscillating wheel arranged within the housing and configured to be rotatable about the center axis of the housing, the oscillating wheel having external teeth and a central recess surrounded by a collar, the collar projecting axially out of the central opening of the housing; and
a bushing having a central aperture and an annular shoulder surrounding the center axis of the housing and projecting axially into the central recess of the oscillating wheel, wherein the bushing fits into and supports the central opening of the housing,
wherein the external teeth of the oscillating wheel mesh with the internal teeth of the housing, and
wherein the housing is divided along a dividing plane into at least two housing parts, which are joined together in an assembled state.

22. A wobble mechanism for a two-part adjustment fitting of a motor vehicle seat, the wobble mechanism comprising:
a flat housing having an outer wheel with internal teeth; and
an oscillating wheel arranged within the housing and configured to be eccentrically rotatable about a center axis of the housing, the oscillating wheel having external teeth,
wherein the external teeth of the oscillating wheel mesh with the internal teeth of the housing,
wherein the housing is divided along a dividing plane into at least two housing parts, which are joined together in an assembled state, each of the housing parts comprising a flat disk, the flat disks having a same diameter and comprising parallel annular sections, and
wherein an outer circumference of the at least two housing parts are aligned.

23. A wobble mechanism for a two-part adjustment fitting of a motor vehicle seat, the wobble mechanism comprising:
a flat housing having an outer wheel with internal teeth; and
an oscillating wheel arranged within the housing and configured to be eccentrically rotatable about a center axis of the housing, the oscillating wheel having external teeth,
wherein the external teeth of the oscillating wheel mesh with the internal teeth of the housing,
wherein the housing is divided along a dividing plane into at least two housing parts, which are joined together in an assembled state, each of the housing parts comprising a flat disk, the flat disks having a same diameter and comprising parallel annular sections, and
wherein each of the housing parts consists of the flat disk.

24. A wobble mechanism for a two-part adjustment fitting of a motor vehicle seat, the wobble mechanism comprising:
a flat housing having an outer wheel with internal teeth; and
an oscillating wheel arranged within the housing and configured to be eccentrically rotatable about a center axis of the housing, the oscillating wheel having external teeth,
wherein the external teeth of the oscillating wheel mesh with the internal teeth of the housing,
wherein the housing is divided along a dividing plane into at least two housing parts, which are joined together in an assembled state, each of the housing parts comprising a flat disk, the flat disks having a same diameter and comprising parallel annular sections,
wherein the parallel annular sections are in contact with each other, and
wherein each of the housing parts consists of the flat disk.

25. A wobble mechanism for a two-part adjustment fitting of a motor vehicle seat, the wobble mechanism comprising:
a flat housing having an outer wheel with internal teeth; and
an oscillating wheel arranged within the housing and configured to be eccentrically rotatable about a center axis of the housing, the oscillating wheel having external teeth,
wherein the external teeth of the oscillating wheel mesh with the internal teeth of the housing, and
wherein the housing is divided along a dividing plane into at least two housing parts, which are joined together in an assembled state, each of the housing parts is a flat disk, the flat disks having a same diameter and comprising parallel annular sections that are in contact with each other.

* * * * *